(12) United States Patent
Fiske et al.

(10) Patent No.: US 9,058,120 B2
(45) Date of Patent: Jun. 16, 2015

(54) SETTING OPTIMAL SPACE ALLOCATION POLICY FOR CREATING DEPENDENT SNAPSHOTS TO ENHANCE APPLICATION WRITE PERFORMANCE AND REDUCE RESOURCE USAGE

(75) Inventors: Rahul M. Fiske, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/292,335

(22) Filed: Nov. 9, 2011

(65) Prior Publication Data

US 2013/0117505 A1 May 9, 2013

(51) Int. Cl.
| | | |
|---|---|---|
| *G06F 12/00* | (2006.01) | |
| *G06F 13/00* | (2006.01) | |
| *G06F 3/06* | (2006.01) | |
| *G06F 17/30* | (2006.01) | |

(52) U.S. Cl.
CPC .......... *G06F 3/065* (2013.01); *G06F 17/30088* (2013.01); *G06F 3/0662* (2013.01); *G06F 3/061* (2013.01); *G06F 3/067* (2013.01)

(58) Field of Classification Search
CPC .................................. G06F 3/061; G06F 3/065
See application file for complete search history.

(56) References Cited

U.S. PATENT DOCUMENTS

| | | | | |
|---|---|---|---|---|
| 5,386,545 A | * | 1/1995 | Gombos et al. | 707/640 |
| 6,108,748 A | * | 8/2000 | Ofek et al. | 711/112 |
| 6,230,246 B1 | * | 5/2001 | Lee et al. | 711/167 |
| 6,457,109 B1 | * | 9/2002 | Milillo et al. | 711/162 |
| 6,640,291 B2 | * | 10/2003 | Fujibayashi et al. | 711/162 |
| 6,728,736 B2 | * | 4/2004 | Hostetter et al. | 1/1 |
| 6,915,397 B2 | * | 7/2005 | Lubbers et al. | 711/162 |
| 7,055,010 B2 | | 5/2006 | Lin et al. | |
| 7,069,402 B2 | * | 6/2006 | Coulter et al. | 711/162 |
| 7,072,916 B1 | | 7/2006 | Lewis et al. | |
| 7,093,086 B1 | * | 8/2006 | van Rietschote | 711/161 |
| 7,111,147 B1 | * | 9/2006 | Strange et al. | 711/209 |
| 7,191,304 B1 | * | 3/2007 | Cameron et al. | 711/202 |
| 7,216,135 B2 | * | 5/2007 | Sawdon et al. | 1/1 |
| 7,225,210 B2 | | 5/2007 | Guthrie, II. | |
| 7,236,987 B1 | * | 6/2007 | Faulkner et al. | 1/1 |
| 7,263,590 B1 | * | 8/2007 | Todd et al. | 711/165 |
| 7,290,102 B2 | * | 10/2007 | Lubbers et al. | 711/162 |
| 7,343,449 B2 | * | 3/2008 | Arai et al. | 711/113 |
| 7,430,568 B1 | * | 9/2008 | DeKoning et al. | 1/1 |
| 7,606,844 B2 | * | 10/2009 | Kottomtharayil | 1/1 |
| 7,664,771 B2 | * | 2/2010 | Kusters et al. | 707/639 |

(Continued)

OTHER PUBLICATIONS

Definition of "proviso", Merriam-Webster Dictionary, retrieved from http://www.merriam-webster.com/dictionary/proviso on May 28, 2013 (1 page).*

(Continued)

*Primary Examiner* — Sanjiv Shah
*Assistant Examiner* — Daniel C Chappell
(74) *Attorney, Agent, or Firm* — Zilka-Kotab, PC

(57) ABSTRACT

In one embodiment, a system includes a network storage controller having logic adapted for receiving a request to duplicate at least a portion of a volume stored on the first disk array, logic adapted for creating at least one dependent volume on the first disk array, and logic adapted for duplicating the at least the portion of the volume to the at least one dependent volume on the first disk array to create a snapshot. Other systems, computer program products, and methods are described according to more embodiments.

18 Claims, 4 Drawing Sheets

(56) References Cited

U.S. PATENT DOCUMENTS

| | | | |
|---|---|---|---|
| 7,676,514 B2* | 3/2010 | Faibish et al. | 707/646 |
| 7,865,676 B2* | 1/2011 | Nagata et al. | 711/161 |
| 7,870,356 B1 | 1/2011 | Veeraswamy et al. | |
| 7,925,622 B2 | 4/2011 | Chapman | |
| 8,001,351 B2* | 8/2011 | Liu et al. | 711/165 |
| 8,082,411 B1* | 12/2011 | Seetharam et al. | 711/165 |
| 8,307,171 B2* | 11/2012 | Ogawa et al. | 711/154 |
| 8,447,726 B2* | 5/2013 | Patterson | 707/626 |
| 8,510,524 B1* | 8/2013 | Corbett et al. | 711/162 |
| 8,621,165 B1* | 12/2013 | Sridharan et al. | 711/162 |
| 8,677,085 B2* | 3/2014 | Vaghani et al. | 711/161 |
| 8,713,267 B2* | 4/2014 | Jess | 711/162 |
| 8,725,971 B2* | 5/2014 | Nakamura et al. | 711/162 |
| 8,732,422 B2* | 5/2014 | Yoshida et al. | 711/165 |
| 8,745,336 B2* | 6/2014 | Vaghani | 711/154 |
| 2002/0112113 A1* | 8/2002 | Karpoff et al. | 711/4 |
| 2003/0079102 A1* | 4/2003 | Lubbers et al. | 711/202 |
| 2004/0186900 A1* | 9/2004 | Nakano et al. | 709/213 |
| 2005/0144404 A1* | 6/2005 | Nashimoto et al. | 711/154 |
| 2005/0210193 A1* | 9/2005 | Nagata | 711/114 |
| 2005/0210209 A1* | 9/2005 | Nagata | 711/162 |
| 2006/0218364 A1* | 9/2006 | Kitamura | 711/162 |
| 2007/0143371 A1* | 6/2007 | Kottomtharayil | 707/204 |
| 2007/0226438 A1* | 9/2007 | Erofeev | 711/162 |
| 2007/0260830 A1* | 11/2007 | Faibish et al. | 711/162 |
| 2007/0276916 A1* | 11/2007 | McLoughlin et al. | 709/208 |
| 2008/0072003 A1* | 3/2008 | Vu et al. | 711/162 |
| 2009/0037679 A1* | 2/2009 | Kaushik et al. | 711/162 |
| 2009/0094252 A1* | 4/2009 | Wong et al. | 707/10 |
| 2010/0287345 A1* | 11/2010 | Cherian et al. | 711/162 |
| 2012/0254114 A1* | 10/2012 | Gundy et al. | 707/639 |

OTHER PUBLICATIONS

Implementing the IBM System Storage SAN Volume Controller V5.1, Tate et al, Mar. 2010, retrieved from http://www.redbooks.ibm.com/redbooks/pdfs/sg246423.pdf on Aug. 20, 2014 (858 pages).*

Edwards et al., "Flex vol.: Flexible, Efficient File Volume Virtualization in WAFL," USENIX Association, USENIX '08: 2008 USENIX Annual Technical Conference, pp. 129-142.

Meyer et al., "Parallax: Virtual Disks for Virtual Machines," 2008 ACM, EuroSys '08, Apr. 1-4, 2008, Glasgow, Scotland, UK, pp. 1-14.

Sapuntzakis et al., "Optimizing the Migration of Virtual Computers," Proceedings of the 5th Symposium on Operating Systems Design and Implementation, 2002, pp. 1-14.

* cited by examiner

SETTING OPTIMAL SPACE ALLOCATION POLICY FOR CREATING DEPENDENT SNAPSHOTS TO ENHANCE APPLICATION WRITE PERFORMANCE AND REDUCE RESOURCE USAGE

BACKGROUND

The present invention relates to data storage systems, and more particularly, this invention relates to setting optimal space allocation policy for creating dependent snapshots to enhance application WRITE performance and reduce resource usage.

Block virtualization solutions like host-based volume managers, e.g., logical volume manager (LVM), storage area network (SAN) virtualizers (e.g., IBM SAN Volume Controller), etc., provide volume snapshot capability. Copy on Write (COW) snapshots involve creation of dependent virtual disks (snapshots). COW snapshots are dependent on the original volume for all or part of their data storage. Initially, both the original volume and the snapshot volume point to the same data on the underlying storage. New physical space is allocated for the snapshot volume only when an application modifies data on the original volume and there is a need to copy old data from the original volume to the snapshot volume (to preserve a copy of the old data). Typically, block virtualization solutions use the COW technique for copying original data from a parent volume to a dependent volume while processing application WRITE operations on the original volume. The COW operation typically has the following steps: 1) hold application WRITE data in a memory buffer; 2) READ old data from the original volume into RAM; 3) WRITE old data from RAM to the snapshot volume (after new physical storage space has been allocated for the snapshot volume to hold the old data); and 4) allow WRITE data (held in step #1) to be written to the original volume.

It can be seen from the above described process that the COW operation is resource intensive because it requires additional memory and SAN usage due to internal READ and WRITE operations generated in addition to the application WRITE. Additionally, a COW operation increases write latency as it is synchronously performed in application I/O context, i.e., the original application WRITE I/O is held until the COW operation has been completed. The above two problems present a serious hindrance to using COW snapshots with WRITE operations and also to making the operation less resource intensive for the virtualization software being used (e.g., LVM, IBM SAN Volume Controller, etc.)

Most existing solutions perform the COW operation according to the steps described above and therefore suffer from WRITE latency issues when using COW snapshots. A minority of virtualization solutions advocate the use of the XCOPY SCSI operation to ensure that the COW operation is less resource intensive for the virtualization software. However, XCOPY is not a mandatory SCSI command which results in it often not being supported, and even if it is supported, only a subset of the whole XCOPY command is usually supported. Also, there is no explicit attempt made to locate the snapshot and original volumes on the same disk array by existing solutions. That means that even if the XCOPY Command is used, data is copied across disk arrays, thus making it a relatively more time consuming operation.

BRIEF SUMMARY

In one embodiment, a system includes a network storage controller having logic adapted for receiving a request to duplicate at least a portion of a volume stored on the first disk array, logic adapted for creating at least one dependent volume on the first disk array, and logic adapted for duplicating the at least the portion of the volume to the at least one dependent volume on the first disk array to create a snapshot.

In another embodiment, a computer program product includes a computer readable storage medium having computer readable program code embodied therewith, the computer readable program code including computer readable program code configured to receive a request to duplicate at least a portion of a volume stored on a first disk array, computer readable program code configured to create at least one dependent volume on the first disk array, and computer readable program code configured to duplicate the at least the portion of the volume to the at least one dependent volume on the first disk array to create a snapshot.

In another embodiment, a method includes receiving a request to duplicate at least a portion of a volume stored on a first disk array managed by a storage controller, creating at least one dependent volume on the first disk array using the storage controller, duplicating the at least the portion of the volume to the at least one dependent volume on the first disk array to create a snapshot.

Any of these embodiments may be implemented in any type of data storage system, such as solid state drive (SSD) storage systems, magnetic data storage systems such as virtual tape systems which may include a plurality of tape drive systems, and each tape drive system may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
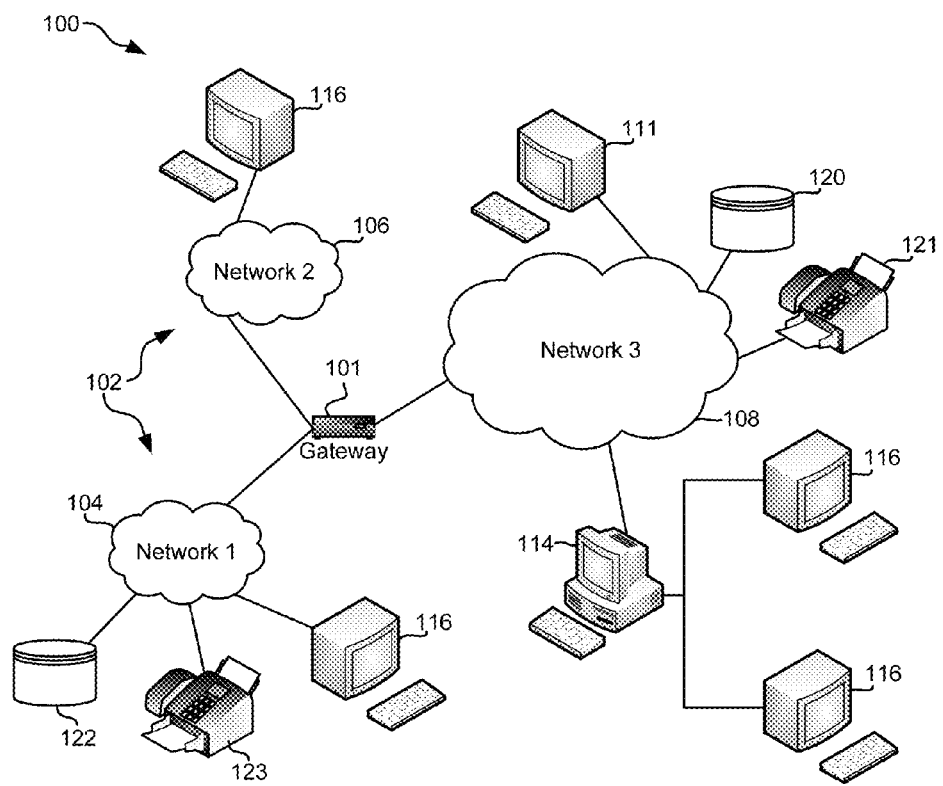
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a system includes a network storage controller having logic adapted for receiving a request to duplicate at least a portion of a volume stored on the first disk array, logic adapted for creating at least one dependent volume on the first disk array, and logic adapted for duplicating the at least the portion of the volume to the at least one dependent volume on the first disk array to create a snapshot. The first disk array may have a plurality of redundant independent disks, each disk being adapted for storing one or more volumes of data thereon, In another general embodiment, a computer program product includes a computer readable storage medium having computer readable program code embodied therewith, the computer readable program code including computer readable program code configured to receive a request to duplicate at least a portion of a volume stored on a first disk array, computer readable program code configured to create at least one dependent volume on the first disk array, and computer readable program code configured to duplicate the at least the portion of the volume to the at least one dependent volume on the first disk array to create a snapshot.

In another general embodiment, a method includes receiving a request to duplicate at least a portion of a volume stored on a first disk array managed by a storage controller, creating at least one dependent volume on the first disk array using the storage controller, duplicating the at least the portion of the volume to the at least one dependent volume on the first disk array to create a snapshot.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing, either transitory or non-transitory in nature. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, 121, 122, 123, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
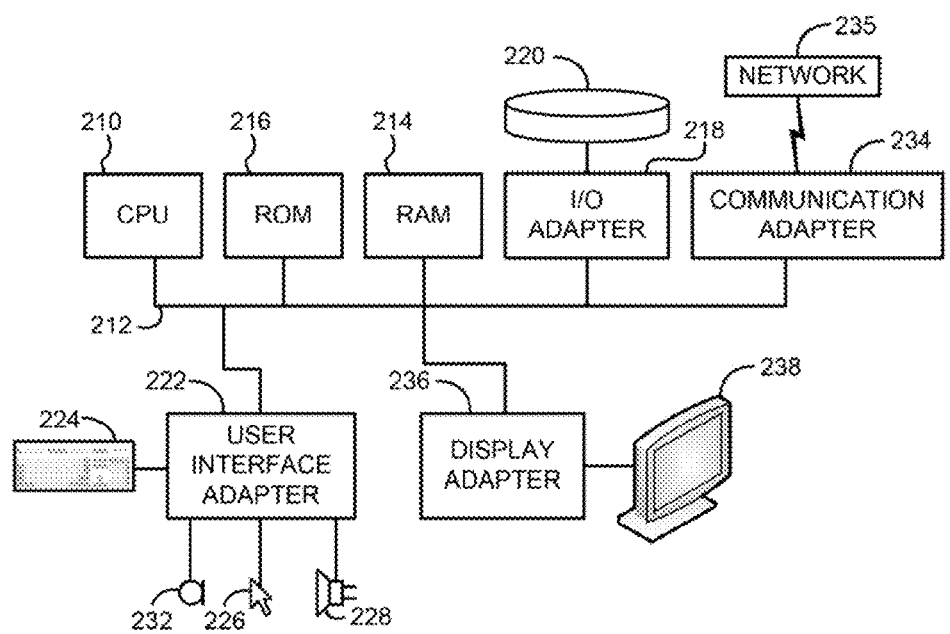
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), an IBM z/OS, a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

According to one embodiment, a space allocation policy is defined and implemented which dictates how dependent volumes are created, such as snapshots, copy on write (COW) snapshots, flash copy images, etc., for any given parent volume (direct or cascaded snapshots). This way when an application issues a WRITE to the production/parent volume, block virtualization software internally generates one or more snapshot operations. These snapshot operations for all the snapshots may be offloaded to a storage controller on the disk array, in one embodiment. The Small Computer System Interface (SCSI) standard includes the "EXTEND_COPY (XCOPY)" command which can be used for this purpose. In cases where the storage controller for the disk array does not implement the XCOPY command, a combination of READ/WRITE commands may be issued internally by the storage controller to achieve the same result as a snapshot operation, such as a COW operation.

In one embodiment, a technique where block virtualization software or a block virtualization layer, e.g., a logical volume manager (LVM), Veritas Volume Manager (VxVM), IBM SAN Volume Controller, etc.) ensures that dependent volumes are created on the same disk array as that of an original volume which is being duplicated may be used. By locating the original volume and the snapshot volume on the same array, snapshot operations like COW may be completely offloaded to the storage array itself. This ensures better resource utilization within the virtualization layer and also reduces application write latency. By offloading the snapshot operations, such as COW operations, to the disk array, the virtualization software does not need to perform a READ operation on data from the physical disk onto system RAM and WRITE it back to disks, thus saving memory and network bandwidth.

Since the snapshot (dependent) volume is dependent on the original volume, there is no advantage gained by allocating the snapshot volume on a different disk array in terms of fault domain separation. While allocating the snapshot volume on the same disk array ensures the snapshot operation is much faster due to local XCOPY on the same disk array as compared to copying data across different disk arrays.

Implementation of the embodiments and approaches described herein is possible even if a reduced version of XCOPY is implemented by a storage sub-system where an Extended Copy operation can be performed only within a disk array and not across disk arrays. Therefore, by taking advantage of XCOPY commands that are partially implemented by vendors, which is more often the case, the dependent volume may be located on the same disk array as the parent volume.

According to various embodiments described herein, locating the original volume and the snapshot (dependent) volume on the same network storage controller will ensure better cache utilization. This is because data blocks from the original volume can be cached on the same controller as the snapshot volume, thus ensuring that the same cache block can serve I/Os to both the original and snapshot volumes. This is especially true for SAN virtualization solutions, such as the IBM SAN Volume Controller, among others.

By ensuring that the space for the dependent volume is allocated to the same disk array that the parent volume is located allows for snapshot operations to be offloaded to the storage controller on the disk array, thereby reducing resource consumption by a block virtualization layer, including both memory and network usage, in some approaches.

A single storage controller may perform data copy operations much faster internally as compared to an external block virtualization layer performing the same operation. This allows for a significant reduction in application write latency. If the XCOPY command is used to assist the snapshot operation, such as a COW operation, it will operate much faster if the source volume blocks and target volume blocks are located within the same disk array instead of across different disk arrays. This is possible in both host-based as well as SAN-based virtualization software.

Figure 3:
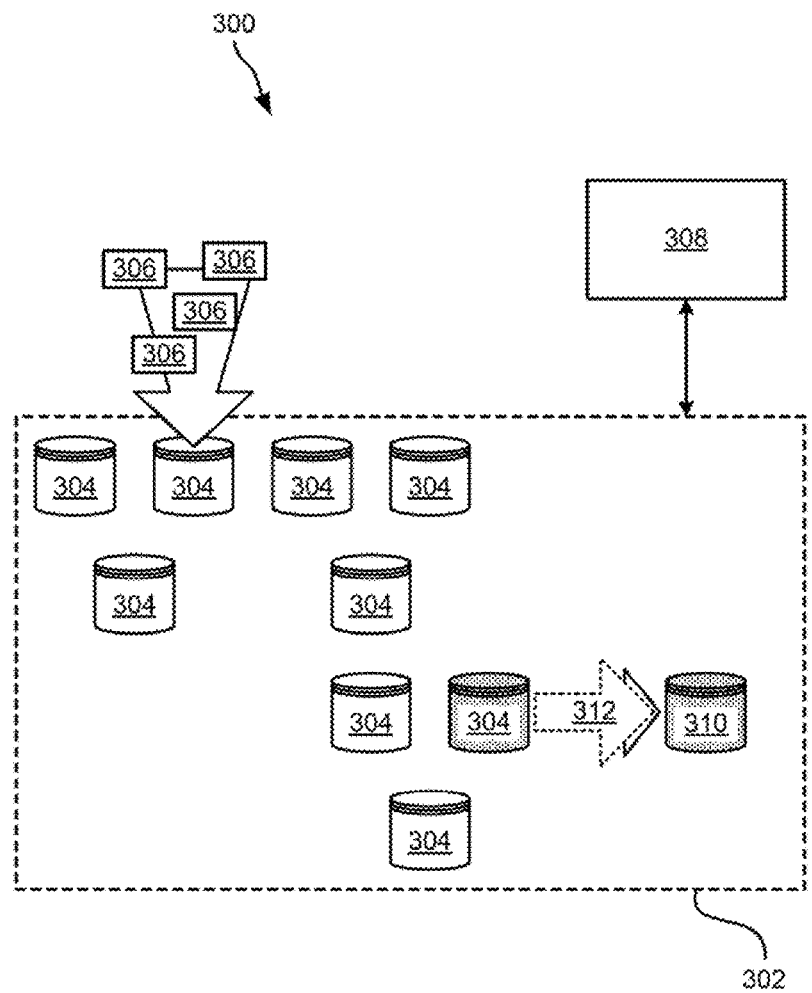
FIG. 3 illustrates a data storage system, according to one embodiment.
Figure 4:
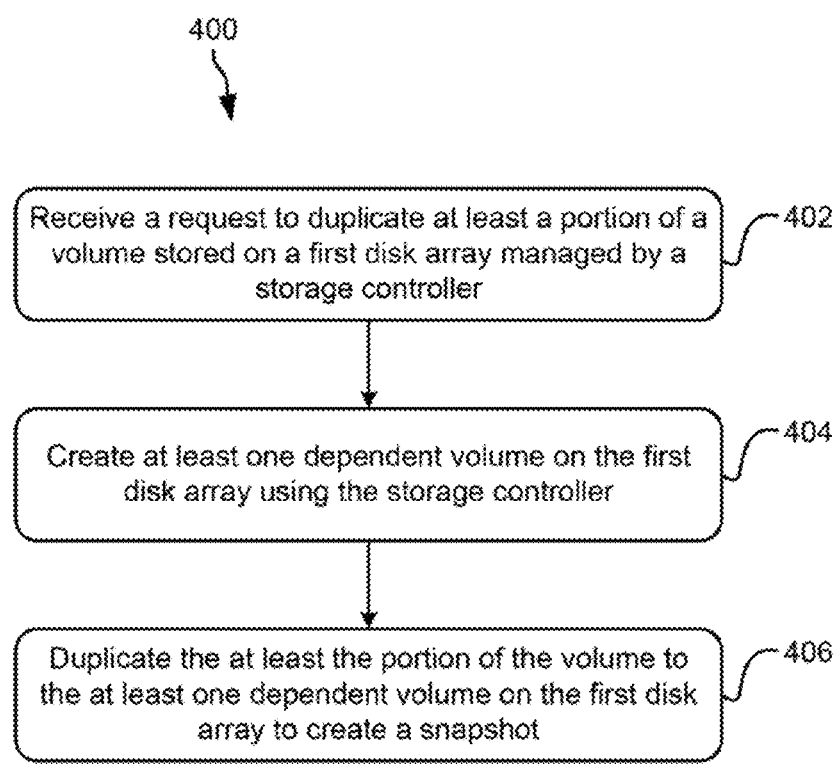
FIG. 4 shows a flowchart of a method according to one embodiment.

Now referring to FIG. 4, a method 400 is described according to one embodiment. The method 400 may be carried out in any desired environment, including those described in FIGS. 1-3, according to various embodiments. More or less operations than those described in FIG. 4 may be included in method 400, as would be understood by one of skill in the art upon reading the present descriptions.

In operation 402, a request to duplicate at least a portion of a volume stored on a first disk array managed by a storage controller is received. The request may be received by the storage controller or by any other entity, computer system, module, device, application, etc., as would be known to one of skill in the art. Furthermore, the request to duplicate data may be received as a result of a COW operation triggered due to an application write, among other possibilities.

In operation 404, at least one dependent volume is created on the first disk array using the storage controller. The dependent volume may be created using any method or technique as would be known to one of skill in the art.

In one embodiment, the dependent volume is only created on the first disk array, thereby ensuring that the write and copy operations may be performed exclusively on the same disk array, and may be offloaded from entities other than the storage controller.

In another embodiment, block virtualization software may ensure that the at least one dependent volume is created on the first disk array by the storage controller.

In one embodiment, a policy may be set to ensure that the at least one dependent volume is only created on the first disk array by the storage controller.

In operation 406, the at least the portion of the volume is duplicated to the at least one dependent volume on the first disk array to create a snapshot. This snapshot may be created using any method or technique as would be known in the art, such as a snapshot operation, a Copy on Write (COW) operation, a flash image copy, etc.

In one embodiment, the duplicating may comprise a COW snapshot, with the proviso that a virtualization layer does not perform any duplicating.

According to a further embodiment, a cache of the storage controller may be shared between the at least the portion of the volume and the snapshot on the first disk array, thereby reducing the processing requirements for performing the snapshot.

In one approach, the duplicating may comprise a COW snapshot and the method 400 may further comprise allocating space for the snapshot on the first disk array and offloading COW operations to an entity other than a virtualization layer.

Of course, method 400 may be performed by a system and/or computer program product, as would be understood by one of skill in the art upon reading the present descriptions.

In one embodiment, a data storage system 300 may comprise a first disk array 302 comprising a plurality of redundant independent disks 304 each being adapted for storing one or more volumes of data 306 thereon, a network storage controller 308 comprising logic adapted for receiving a request to duplicate at least a portion of a volume stored on the first disk array 302, logic adapted for creating at least one dependent volume 310 on the first disk array 302, and logic adapted for duplicating 312 the at least the portion of the volume to the at least one dependent volume 310 on the first disk array 302 to create a snapshot. Of course, other systems are capable using the embodiments and approaches described herein.

In one embodiment, a computer program product may comprise a computer readable storage medium having computer readable program code embodied therewith. The computer readable program code may be configured to receive a request to duplicate at least a portion of a volume stored on a first disk array, create at least one dependent volume on the first disk array, and duplicate the at least the portion of the volume to the at least one dependent volume on the first disk array to create a snapshot. Of course, other computer program products are capable using the embodiments and approaches described herein.

In one further embodiment, a virtualization layer and/or virtualization software does not perform any duplicating relating to the snapshot operation, thereby saving resources.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising: a host having logic thereon that is configured to provide a host-based virtualization layer; wherein the host-based virtualization later is configured to set a policy to ensure that a dependent volume is only created on a disk array associated with a parent volume; a plurality of disk arrays in communication with the host, each disk array having a network storage controller there, the storage controller of a first of the disk arrays comprising: logic configured to receive a request from the virtualization later to duplicate at least a portion of a volume stored on the first disk array; logic configured to create a dependent volume only on the first disk array; and logic configured to duplicate the at least the portion of the volume to the dependent volume on the first disk array to create a snapshot, wherein the storage controller has a cache thereon, the cache being shared between the at least the portion of the volume and the dependent volume on the first disk array during the creation of the creation of the snapshot, wherein the creation of the snapshot is performed entirely on the first disk array, wherein the host-based virtualization layer does not perform a read operation on data from the first disk array into memory of the host and write the data back to the first disk array during the creation of the snapshot.

2. The system as recited in claim 1, wherein each storage controller is a single controller.

3. The system as recited in claim 1, wherein the logic configured to duplicate creates a copy on write (COW) snapshot.

4. The system as recited in claim 1, wherein the host-based virtualization layer generates internally thereto a request to perform a snapshot operation in response to receiving a write command, the request to perform the snapshot operation being offloaded from the host-based virtualization layer to the storage controller of the first disk array, thereby reducing memory resource consumption and network resource consumption by the host-based virtualization layer during duplication of the at least the portion of the volume to the dependent volume, and thereby preventing the host-based virtualization layer from performing a READ operation on data from a physical disk into memory and a WRITE operation of the data back to another physical disk.

5. The system as recited in claim 1, wherein the duplicating is performed internally in the first disk array using the storage controller associated therewith.

6. The system as recited in claim 1, wherein a same block of the cache of the storage controller of the first disk array serves input/outputs to both the at least the portion of the volume and the snapshot on the first disk array during writing operations.

7. The system as recited in claim 1, wherein the storage controller of the first disk array is a single processor.

8. The system as recited in claim 2, further comprising the first disk array comprising a plurality of disks, each disk being adapted for storing one or more volumes of data thereon,
wherein the duplicating comprises a copy on write (COW) snapshot, and further comprising:
logic configured to allocate space for the snapshot on the first disk array; and
logic configured to offload COW operations to an entity other than a virtualization layer,
wherein a same block of the cache serves input/outputs to both the at least the portion of the volume and the snapshot on the first disk array during writing operations.

9. The system as recited in claim 1, wherein the logic configured to duplicate creates a flash image copy.

10. A computer program product, the computer program product comprising a non-transitory computer readable storage medium having computer readable program code embodied therewith, the computer readable program code comprising:
computer readable program code configured to receive, from a virtualization layer that is external to a first disk array, a request to duplicate at least a portion of a volume stored on the first disk array;
computer readable program code configured to create dependent volume on the first disk array using a single storage controller on the first disk array itself;
computer readable program code configured to enforce a policy to ensure that the dependent volume is only created on the first disk array;

computer readable program code configured to duplicate the at least the portion of the volume to the dependent volume on the first disk array to create a snapshot by creating a copy on write (COW) snapshot,
wherein the virtualization layer does not perform any duplicating;
wherein the creation of the snapshot is performed entirely on the first disk array;
computer readable program code configured to allocate space for the snapshot on the first disk array; and
computer readable program code configured to share a same block of a cache of the storage controller between the at least the portion of the volume and the snapshot on the first disk array during writing operations.

11. The computer program product as recited in claim 10, wherein the computer readable program code is configured to be executed by a single processor of the storage controller.

12. The computer program product as recited in claim 10, wherein an EXTEND_COPY command is used to perform the snapshot.

13. The computer program product as recited in claim 10, wherein block virtualization software sets the policy that ensures the dependent volume is only created on the first disk array.

14. A method, comprising:
defining a space allocation policy that dictates how dependent volumes within a disk array are created for an original volume within the same disk array;
receiving, at a virtualization layer, a write command from an application, wherein the write command is directed to the original volume within the disk array;
implementing the space allocation policy by:
in response to the write command directed to the original volume, generating, internally in the virtualization layer, at least one snapshot operation in accordance with the space allocation policy, wherein:
the virtualization layer is external to the disk array,
the at least one snapshot operation is for duplicating at least a portion of the original volume to a second volume within the disk array,
the disk array is managed by a single storage controller having a single processor, and
the single storage controller is on the disk array,
offloading the at least one snapshot operation by sending the at least one snapshot operation from the virtualization layer to the single storage controller of the disk array, such that the virtualization layer does not perform any duplicating,
receiving, at the single storage controller of the disk array, the at least one snapshot operation, and
in response to receiving the at least one snapshot operation, issuing, internally by the single storage controller, at least one command to achieve the at least one snapshot operation by creating the second volume on the disk array and duplicating the at least the portion of the original volume to the second volume wherein the at least one command depends on the disk array and includes at least one of:
an EXTEND_COPY (XCOPY) command, and
a combination of READ/WRITE commands; and
serving input/outputs to both the original volume and the second volume using a same block of a cache of the single storage controller.

15. The method as recited in claim 14, wherein the at least one command includes the EXTEND_COPY (XCOPY) command.

16. The method as recited in claim 14, wherein the virtualization layer is host-based.

17. The method as recited in claim 15, wherein a reduced version of the EXTEND_COPY (XCOPY) command is used.

18. The method as recited in claim 14, wherein the at least one snapshot operation includes a flash image copy.

* * * * *